(12) United States Patent
Ngo et al.

(10) Patent No.: US 10,707,911 B2
(45) Date of Patent: Jul. 7, 2020

(54) RADIO FREQUENCY FRONT-END BUS HUB CIRCUIT AND RELATED APPARATUS

(71) Applicant: Qorvo US, Inc., Greensboro, NC (US)

(72) Inventors: Christopher Truong Ngo, Queen Creek, AZ (US); Alexander Wayne Hietala, Phoenix, AZ (US)

(73) Assignee: Qorvo US, Inc., Greensboro, NC (US)

(*) Notice: Subject to any disclaimer, the term of this patent is extended or adjusted under 35 U.S.C. 154(b) by 0 days.

(21) Appl. No.: 16/391,646

(22) Filed: Apr. 23, 2019

(65) Prior Publication Data

US 2020/0153470 A1 May 14, 2020

Related U.S. Application Data

(60) Provisional application No. 62/757,448, filed on Nov. 8, 2018.

(51) Int. Cl.
*H04L 5/12* (2006.01)
*H04B 1/3805* (2015.01)
*H04B 1/401* (2015.01)
*H04B 1/04* (2006.01)

(52) U.S. Cl.
CPC ............ *H04B 1/3805* (2013.01); *H04B 1/04* (2013.01); *H04B 1/401* (2013.01)

(58) Field of Classification Search
CPC ......... H04B 1/3805; H04B 1/04; H04B 1/401
See application file for complete search history.

(56) References Cited

U.S. PATENT DOCUMENTS

| | | | |
|---|---|---|---|
| 10,185,683 B2 | 1/2019 | Ngo et al. | |
| 2008/0046603 A1* | 2/2008 | Kobayashi | G06F 11/364 710/17 |
| 2015/0193297 A1 | 7/2015 | Ngo et al. | |
| 2015/0193298 A1 | 7/2015 | Ngo et al. | |
| 2018/0234383 A1* | 8/2018 | Daugherty | H04L 49/358 |
| 2019/0236042 A1* | 8/2019 | O'Shea | G06F 13/4022 |

* cited by examiner

*Primary Examiner* — Dhaval V Patel
(74) *Attorney, Agent, or Firm* — Withrow & Terranova, P.L.L.C.

(57) ABSTRACT

A radio frequency front-end (RFFE) bus hub circuit and related apparatus are provided. In examples discussed herein, the RFFE bus hub circuit can be configured to bridge an RFFE bus with a number of auxiliary RFFE buses. In a non-limiting example, each of the auxiliary RFFE buses can be configured to support up to fourteen RFFE slaves. Thus, by bridging the RFFE bus with multiple auxiliary RFFE buses using the RFFE bus hub circuit, it may be possible to support more than fifteen RFFE slaves without adding an additional RFFE bus. As a result, it may be possible to reduce pin count requirement for an RFFE master and/or enable flexible RFFE bus deployment in an RFFE apparatus.

20 Claims, 8 Drawing Sheets

RADIO FREQUENCY FRONT-END BUS HUB CIRCUIT AND RELATED APPARATUS

RELATED APPLICATIONS

This application claims the benefit of U.S. provisional patent application Ser. No. 62/757,448, filed on Nov. 8, 2018, the disclosure of which is incorporated herein by reference in its entirety.

FIELD OF THE DISCLOSURE

The technology of the disclosure relates generally to a radio frequency (RF) circuit incorporating an RF front-end interface configured in accordance to MIPI® Alliance Specification for RF Front-End Control Interface (RFFE$^{SM}$).

BACKGROUND

Mobile communication devices have become increasingly common in current society. The prevalence of these mobile communication devices is driven in part by the many functions that are now enabled on such devices. Increased processing capabilities in such devices means that mobile communication devices have evolved from being pure communication tools into sophisticated mobile multimedia centers that enable enhanced user experiences.

The redefined user experience requires higher data rates offered by wireless communication technologies, such as Wi-Fi, long-term evolution (LTE), and fifth-generation new-radio (5G-NR). To achieve the higher data rates in mobile communication devices, sophisticated power amplifiers may be employed to increase output power of radio frequency (RF) signals (e.g., maintaining sufficient energy per bit) communicated by mobile communication devices. However, the increased output power of RF signals can lead to increased power consumption and thermal dissipation in mobile communication devices, thus compromising overall performance and user experiences.

Envelope tracking (ET) is a power management technology designed to improve efficiency levels of power amplifiers to help reduce power consumption and thermal dissipation in a mobile communication device. In an ET system, an ET circuit may be configured to provide a time-variant ET voltage to a power amplifier(s) for amplifying an RF signal(s). To achieve desirable efficiency and linearity at the power amplifier(s), it may be necessary for the time-variant ET voltage to track closely with a time-variant power envelope of the RF signal(s). In this regard, the time-variant ET voltage should increase and decrease according to the rise and fall of the time-variant power envelope.

The RF signal(s), along with the time-variant power envelope, may be generated in a transceiver circuit(s) and provided to the ET circuit and the power amplifier(s). Typically, the transceiver circuit(s) is coupled to the ET circuit and the power amplifier(s) via a two-wire serial interface known as an RF front-end (RFFE) bus. In a non-limiting example, the transceiver circuit(s) can be configured to function as an RFFE master on one end of the RFFE bus, while the ET circuit and the power amplifier(s) are configured to function as RFFE slaves on the other end of the RFFE bus. In addition to the ET circuit and the power amplifier(s), the RFFE bus may be further configured to couple additional RFFE slaves (e.g., RF tuners, RF filters, etc.) to the transceiver circuit. In this regard, it may be desired to configure the RFFE bus to support as many RFFE slaves as possible.

SUMMARY

Aspects disclosed in the detailed description include a radio frequency front-end (RFFE) bus hub circuit and related apparatus. In examples discussed herein, the RFFE bus hub circuit can be configured to bridge an RFFE bus with a number of auxiliary RFFE buses. In this regard, the RFFE bus hub circuit may be configured to forward an RFFE command sequence(s) (e.g., register-write, register-read, etc.) received from the RFFE bus to one or more of the auxiliary RFFE buses. The RFFE bus hub circuit may be further configured to forward a RFFE data payload(s) received from one or more of the auxiliary RFFE buses to the RFFE bus. In a non-limiting example, each of the auxiliary RFFE buses can be configured to support up to fourteen RFFE slaves. Thus, by bridging the RFFE bus with multiple auxiliary RFFE buses using the RFFE bus hub circuit, it may be possible to support more than fifteen RFFE slaves without adding an additional RFFE bus. As a result, it may be possible to reduce pin count requirement for an RFFE master and/or enable flexible RFFE bus deployment in an RFFE apparatus.

In one aspect, an RFFE bus hub circuit is provided. The RFFE bus hub circuit includes a primary port coupled to an RFFE bus. The RFFE bus hub circuit also includes at least one first auxiliary port coupled to at least one first auxiliary RFFE bus. The RFFE bus hub circuit also includes at least one second auxiliary port coupled to at least one second auxiliary RFFE bus. The RFFE bus hub circuit also includes a hub controller configured to selectively activate at least one of the at least one first auxiliary port and the at least one second auxiliary port in response to receiving an RFFE command sequence corresponding to the RFFE bus hub circuit such that the RFFE master can communicate with at least one of the at least one first RFFE slave and the at least one second RFFE slave.

In another aspect, an RFFE apparatus is provided. The RFFE apparatus includes an RFFE bus and an RFFE master coupled to the RFFE bus. The RFFE apparatus also includes at least one first auxiliary RFFE bus and a number of first RFFE slaves coupled to the at least one first auxiliary RFFE bus. The RFFE apparatus also includes at least one second auxiliary RFFE bus and a number of second RFFE slaves coupled to the at least one second auxiliary RFFE bus. The RFFE apparatus also includes an RFFE bus hub circuit. The RFFE bus hub circuit includes a primary port coupled to the RFFE bus. The RFFE bus hub circuit also includes at least one first auxiliary port coupled to the at least one first auxiliary RFFE bus. The RFFE bus hub circuit also includes at least one second auxiliary port coupled to the at least one second auxiliary RFFE bus. The RFFE bus hub circuit also includes a hub controller configured to selectively activate at least one of the at least one first auxiliary port and the at least one second auxiliary port in response to receiving an RFFE command sequence corresponding to the RFFE bus hub circuit such that the RFFE master can communicate with at least one of the first RFFE slaves and the second RFFE slaves.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure and, together with the description, serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Aspects disclosed in the detailed description include a radio frequency front-end (RFFE) bus hub circuit and related apparatus. In examples discussed herein, the RFFE bus hub circuit can be configured to bridge an RFFE bus with a number of auxiliary RFFE buses. In this regard, the RFFE bus hub circuit may be configured to forward an RFFE command sequence(s) (e.g., register-write, register-read, etc.) received from the RFFE bus to one or more of the auxiliary RFFE buses. The RFFE bus hub circuit may be further configured to forward a RFFE data payload(s) received from one or more of the auxiliary RFFE buses to the RFFE bus. In a non-limiting example, each of the auxiliary RFFE buses can be configured to support up to fourteen RFFE slaves. Thus, by bridging the RFFE bus with multiple auxiliary RFFE buses using the RFFE bus hub circuit, it may be possible to support more than fifteen RFFE slaves without adding an additional RFFE bus. As a result, it may be possible to reduce pin count requirement for an RFFE master and/or enable flexible RFFE bus deployment in an RFFE apparatus.

Before discussing the RFFE bus hub circuit and the related RFFE apparatus of the present disclosure, an introduction of a multi-master RFFE interface and bus structure, as defined by the MIPI® alliance specification for a radio frequency (RF) front-end control interface, version 2.1 (hereinafter "RFFE specification"), is first provided with reference to FIG. 1. The discussion of specific exemplary aspects of an RFFE apparatus incorporating an RFFE bus hub circuit of the present disclosure starts below with reference to FIG. 2.

Figure 1:
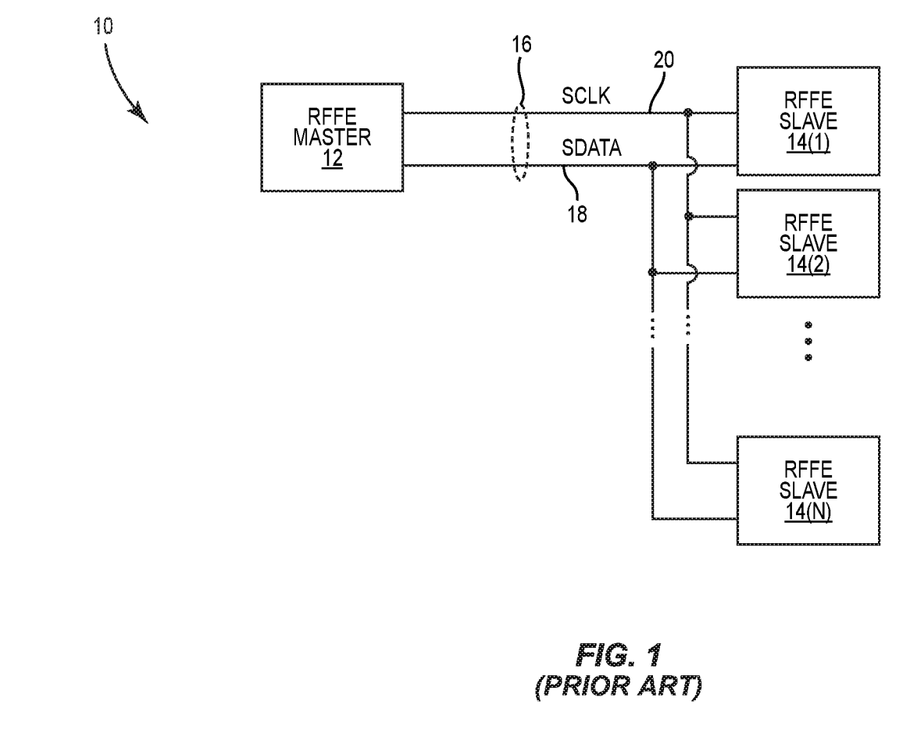
FIG. 1 is a schematic diagram of an exemplary radio frequency front-end (RFFE) bus structure as defined in the MIPI® alliance specification for radio frequency (RF) front-end control interface, version 2.1.

In this regard, FIG. 1 is a schematic diagram of an exemplary RFFE bus structure 10 as defined in the RFFE specification. The RFFE bus structure 10 includes an RFFE master 12 coupled to a number of RFFE slaves 14(1)-14(N) over an RFFE bus 16. According to the RFFE specification, the RFFE bus 16 is a two-wire serial bus that includes a data line 18 and a clock line 20 for communicating a bidirectional data signal SDATA and a clock signal SCLK, respectively.

Further according to the RFFE specification, each of the RFFE slaves 14(1)-14(N) is required to have a unique slave identification (USID) and the RFFE bus structure 10 can support fifteen (15) USIDs between hexadecimal value 0x1 and hexadecimal value 0xF (0x1-0xF). The RFFE specification further assigns hexadecimal value 0x0 to represent a broadcast slave identification (BSID) for all the RFFE slaves 14(1)-14(N). According to the RFFE specifications, each of the RFFE slaves 14(1)-14(N) is assigned one of the 15 USIDs by a system integrator. Accordingly, in the RFFE bus structure 10, it is possible to connect up to 15 RFFE slaves 14(1)-14(15) to the RFFE master 12 via the RFFE bus 16.

The RFFE specification also allows any of the 15 USIDs being used as a group slave identification (GSID) to identify an RFFE slave group. For example, the RFFE bus structure includes five RFFE slaves associated with USIDs 0x1-0x5, respectively. The RFFE slaves associated with USIDs 0x1-0x3 may be clustered into a first RFFE slave group and the RFFE slaves associated with USIDs 0x4-0x5 may be clustered into a second RFFE slave group. The first RFFE slave group and the second RFFE slave group may be assigned USIDs 0x6 and 0x7, respectively. In this regard, the USIDs 0x6 and 0x7 are now used as GSIDs to identify the first RFFE slave group and the second RFFE slave group, respectively. Notably, there will be a lesser number of USIDs available to identify the RFFE slaves 14(1)-14(N) if any of the 15 USIDs is used to represent a GSID.

The RFFE master 12 is configured to communicate with the RFFE slaves 14(1)-14(N) based on RFFE command sequences (e.g. register-write command sequence, register-read command sequence, trigger command sequence, etc.). According to the RFFE specification, only the RFFE master 12 can initiate an RFFE command sequence on the RFFE bus 16.

Each of the RFFE command sequence can be associated with a USID, a GSID, or a BSID. When an RFFE command sequence is communicated based on a specific USID, the RFFE command sequence is addressed to a specific RFFE slave among the RFFE slaves 14(1)-14(N) that is identified by the specific USID. When an RFFE command sequence is communicated based on a specific GSID, the RFFE command sequence is addressed to respective RFFE slaves among the RFFE slaves 14(1)-14(N) associated with the specific GSID. For example, if the command sequence is communicated with GSID 0x6, then the command sequence will be addressed to the RFFE slaves associated with the USIDs 0x1-0x3. When an RFFE command sequence is communicated based on the BSID, all of the RFFE slaves 14(1)-14(N) on the RFFE bus 16 will be able to receive the RFFE command sequence.

As mentioned earlier, the RFFE bus 16 can only support up to 15 RFFE slaves. Furthermore, the number of RFFE slaves that can be connected to the RFFE bus 16 is further reduced if any of the USIDs is used as a GSID. However, in some electronic devices (e.g., a smartphone), it may be necessary to configure an RFFE bus to support more than 15 RFFE slaves. Accordingly, the RFFE specification further provides an option of having multiple RFFE buses and assigning RFFE slaves on separate RFFE buses with conflicting USIDs.

However, it may be challenging to incorporate additional RFFE buses in such space-constrained electronic devices as smartphones. First of all, to support each additional RFFE bus, the RFFE master 12 must provide two additional physical pins for connecting a data line like the data line 18 and a clock line like the clock line 20. This can be very difficult given that the RFFE master 12 can be a transceiver circuit that already has to provide a number of physical pins for connecting to a variety of components and/or circuits. Second, the RFFE master 12 and the RFFE slaves 14(1)-14(N) may be located in different sections of an electronic device. For example, the RFFE master 12 can be located in a center of the electronic device, while the RFFE slaves 14(1)-14(N) are placed close to edges of the electronic device. In this regard, it may be more complicated to make room for the additional RFFE bus and route the additional RFFE bus from the RFFE master 12 to the RFFE slaves 14(1)-14(N). Hence, it may be desired to adapt the RFFE bus structure 10 to support more than 15 RFFE slaves without adding an additional RFFE bus.

Figure 2:
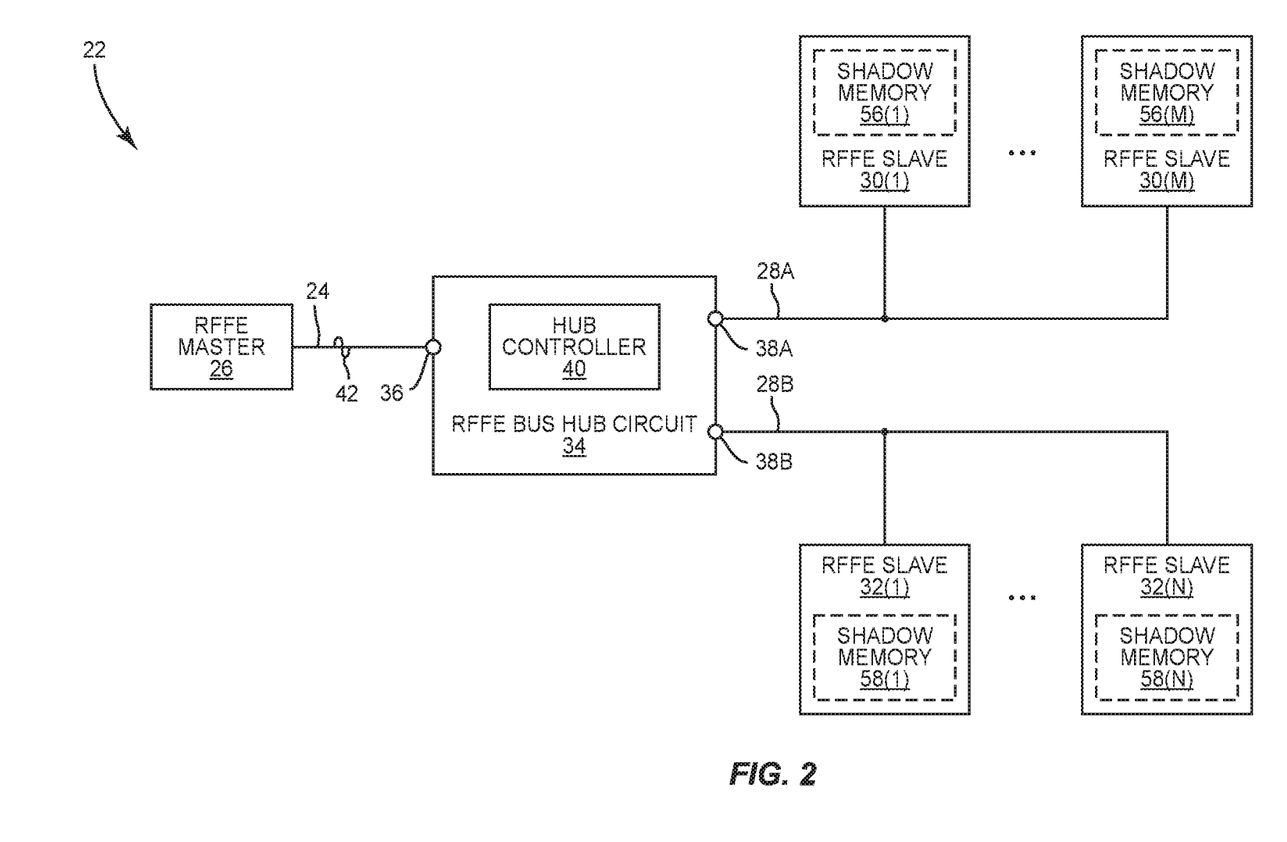
FIG. 2 is a schematic diagram of an exemplary RFFE apparatus that can be configured to support more RFFE slaves than the RFFE structure of FIG. 1.

In this regard, FIG. 2 is a schematic diagram of an exemplary RFFE apparatus 22 that can be configured to support more RFFE slaves than the RFFE bus structure 10 of FIG. 1. The RFFE apparatus 22 includes an RFFE bus 24 and an RFFE master 26 coupled to the RFFE bus 24. Like the RFFE bus 16 in FIG. 1, the RFFE bus 24 is a two-wire serial bus that includes a data line (not shown) and a clock line (not shown) for communicating a bidirectional data signal SDATA and a clock signal SCLK, respectively. The RFFE apparatus 22 includes at least one first auxiliary RFFE bus 28A and at least one second auxiliary bus 28B. Each of the first auxiliary RFFE bus 28A and the second auxiliary RFFE bus 28B is a two-wire serial bus that includes a data line (not shown) and a clock line (not shown) for communicating a bidirectional data signal SDATA and a clock signal SCLK, respectively. The first auxiliary RFFE bus 28A can be configured to support a number of first RFFE slaves 30(1)-30(M) and the second auxiliary RFFE bus 28B can be configured to support a number of second RFFE slaves 32(1)-32(N). Notably, the first auxiliary RFFE bus 28A and the second auxiliary RFFE bus 28B can be configured to support equal or different numbers of RFFE slaves (e.g., M=N, M>N, or M<N). Although the RFFE apparatus 22 is shown to include only the first auxiliary RFFE bus 28A and the second auxiliary RFFE bus 28B, it should be appreciated that the RFFE apparatus 22 can be configured to include additional auxiliary RFFE buses based on the configuration and operation principles described herein.

The RFFE apparatus 22 includes an RFFE bus hub circuit 34 configured to bridge the RFFE bus 24 with the first auxiliary RFFE bus 28A and the second auxiliary RFFE bus 28B. The RFFE bus hub circuit 34 is coupled to the RFFE bus 24, and thus the RFFE master 26, via a primary port 36. The RFFE bus hub circuit 34 is also coupled to the first auxiliary RFFE bus 28A, and thus the first RFFE slaves 30(1)-30(M), via at least one first auxiliary port 38A. The RFFE bus hub circuit 34 is further coupled to the second auxiliary RFFE bus 28B, and thus the second RFFE slaves 32(1)-32(N), via at least one second auxiliary port 38B.

The RFFE bus hub circuit 34 can include a hub controller 40, which can be a microprocessor, a microcontroller, or a field-programmable gate array (FPGA), for example. The hub controller 40 can be configured to selectively activate at least one of the first auxiliary port 38A and the second auxiliary port 38B in response to receiving an RFFE command sequence corresponding to the RFFE bus hub circuit 34 such that the RFFE master 26 can communicate with at least one of the first auxiliary RFFE slaves 30(1)-30(M) and the second auxiliary RFFE slaves 32(1)-32(N). As discussed in detail in FIGS. 4-8 below, the hub controller 40 can be configured to forward various RFFE command sequences and/or data payloads between the RFFE master 26, the first RFFE slaves 30(1)-30(M), and the second RFFE slaves 32(1)-32(N).

The RFFE bus hub circuit 34 can be configured to function as a special RFFE slave to the RFFE master 26. In this regard, the RFFE bus hub circuit 34 can be identified by a specially assigned USID between hexadecimal value 0x1 and hexadecimal value 0xF, such as hexadecimal value 0x1. Accordingly, the RFFE bus hub circuit 34 can be configured to bridge the RFFE bus 24 with the first auxiliary RFFE bus 28A and/or the second auxiliary RFFE bus 28B in response to receiving an RFFE command sequence 42 associated with the specially assigned USID (USID=1) from the RFFE master 26.

The first RFFE slaves 30(1)-30(M) and the second RFFE slaves 32(1)-32(N) are all configured to function as RFFE slaves of the RFFE master 26. The first RFFE slaves 30(1)-30(M) on the first auxiliary RFFE bus 28A can be identified by USIDs between hexadecimal value 0x1 and hexadecimal value 0xF, excluding the specially assigned USID representing the RFFE bus hub circuit 34. Likewise, the second RFFE slaves 32(1)-32(N) on the second auxiliary RFFE bus 28B can be identified by USIDs between hexadecimal value 0x1 and hexadecimal value 0xF, excluding the specially assigned USID representing the RFFE bus hub circuit 34. Given that the USID 0x1 has been used as the specifically assigned USID for identifying the RFFE bus hub circuit 34, the first RFFE slaves 30(1)-30(M) on the first auxiliary RFFE bus 28A can only be identified by USIDs 0x2-0xF. Likewise, the second RFFE slaves 32(1)-32(N) on the second auxiliary RFFE bus 28B can only be identified by USIDs 0x2-0xF as well. In this regard, each of the first auxiliary RFFE bus 28A and the second auxiliary RFFE bus 28B can only support fourteen (14) USIDs. Accordingly, each of the first auxiliary RFFE bus 28A and the second auxiliary RFFE bus 28B can support up to fourteen RFFE slaves. Thus, the first auxiliary RFFE bus 28A and the second auxiliary RFFE bus 28B may collectively support more RFFE slaves (e.g., up to 28) than allowed by the RFFE specification. Notably, it may be possible to support additional RFFE slaves by connecting additional auxiliary RFFE buses to the RFFE bus hub circuit 34.

In this regard, the burden of providing additional physical pins by the RFFE master 26 may be lifted. As such, it may be possible to reduce the footprint of the RFFE master 26 and/or to reconfigure available physical pins for other purposes. In a non-limiting example, the RFFE bus hub circuit 34 can be provided in close proximity to the first RFFE slaves 30(1)-30(M) and/or the second RFFE slaves 32(1)-32(N). By placing the RFFE bus hub circuit 34 in close proximity to the first RFFE slaves 30(1)-30(M) and/or the second RFFE slaves 32(1)-32(N), each of the first RFFE slaves 30(1)-30(M) and/or the second RFFE slaves 32(1)-32(N) can have a shorter coupling distance to the RFFE bus hub circuit 34 than to the RFFE master 26. As such, it may be possible to route the first auxiliary RFFE bus 28A and/or the second auxiliary RFFE bus 28B locally to the RFFE bus hub circuit 34, thus helping to reduce design complexity of the RFFE apparatus 22.

Figure 3:
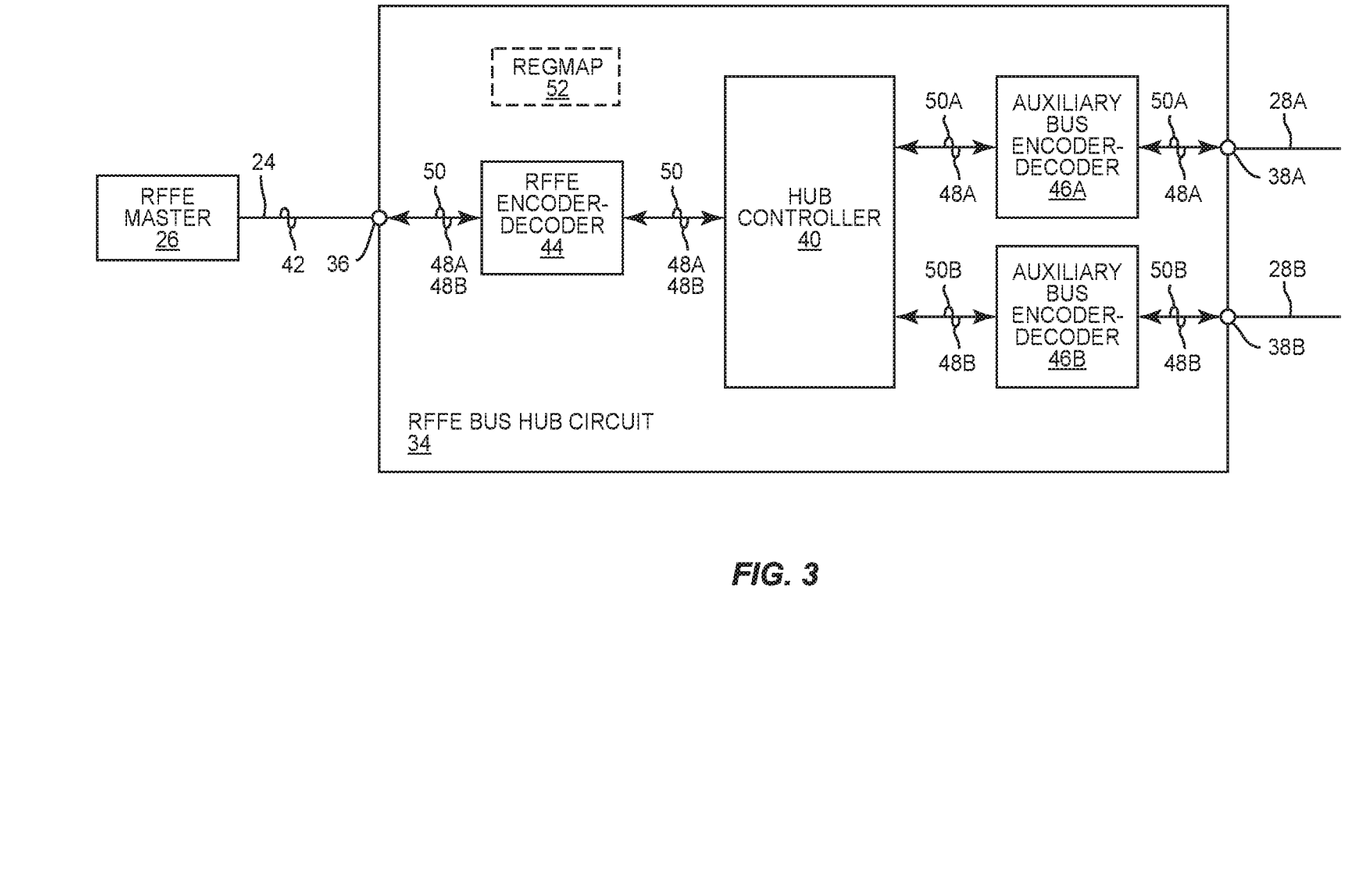
FIG. 3 is a schematic diagram providing an exemplary illustration of an RFFE bus hub circuit, which can be provided in the RFFE apparatus of FIG. 2 for supporting more RFFE slaves, configured according to an embodiment of the present disclosure.

FIG. 3 is a schematic diagram providing an exemplary illustration of the RFFE bus hub circuit 34 of FIG. 2 configured according to an embodiment of the present disclosure. Common elements between FIGS. 2 and 3 are shown therein with common element numbers and will not be re-described herein.

The RFFE bus hub circuit 34 can be configured to include a master encoder-decoder 44 (denoted as "RFFE Encoder-Decoder"), a first auxiliary encoder-decoder 46A (denoted as "Auxiliary Bus Encoder-Decoder"), and a second auxiliary encoder-decoder 46B (also denoted as "Auxiliary Bus Encoder-Decoder"). The master encoder-decoder 44 is coupled between the primary port 36 and the hub controller 40. The first auxiliary encoder-decoder 46A is coupled between the hub controller 40 and the first auxiliary port 38A. The second auxiliary encoder-decoder 46B is coupled between the hub controller 40 and the second auxiliary port 38B.

The master encoder-decoder 44 may be configured to decode a first RFFE command sequence(s) 48A (e.g., register-write, register-read, etc.) and a second RFFE command sequence(s) 48B (e.g., register-write, register-read, etc.) received via the RFFE bus 24. Accordingly, the hub controller 40 may forward the first RFFE command sequence(s) 48A and the second RFFE command sequence(s) 48B to the first auxiliary encoder-decoder 46A and the second auxiliary encoder-decoder 46B for communication via the first auxiliary RFFE bus 28A and the second auxiliary RFFE bus 28B, respectively. The first auxiliary encoder-decoder 46A may be configured to decode a first RFFE data payload(s) 50A received via the first auxiliary RFFE bus 28A. Likewise, the second auxiliary encoder-decoder 46B may be configured to decode a second RFFE data payload(s) 50B received via the second auxiliary RFFE bus 28B. The hub controller 40 may forward an RFFE data payload(s) 50, which can be any of the first RFFE data payload(s) 50A and the second RFFE data payload(s) 50B, to the master encoder-decoder 44 for communication via the RFFE bus 24.

The RFFE bus hub circuit 34 may include a register map (REGMAP) 52, which can include a number of registers (not shown). The REGMAP 52 may be configured (e.g., by the RFFE master 26) to selectively activate the first auxiliary port 38A and/or the second auxiliary port 38B for communicating the RFFE command sequence(s) 48, the first RFFE data payload(s) 50A, and/or the second RFFE data payload(s) 50B between the RFFE bus 24, the first auxiliary RFFE bus 28A, and/or the second auxiliary RFFE bus 28B.

Figure 4:
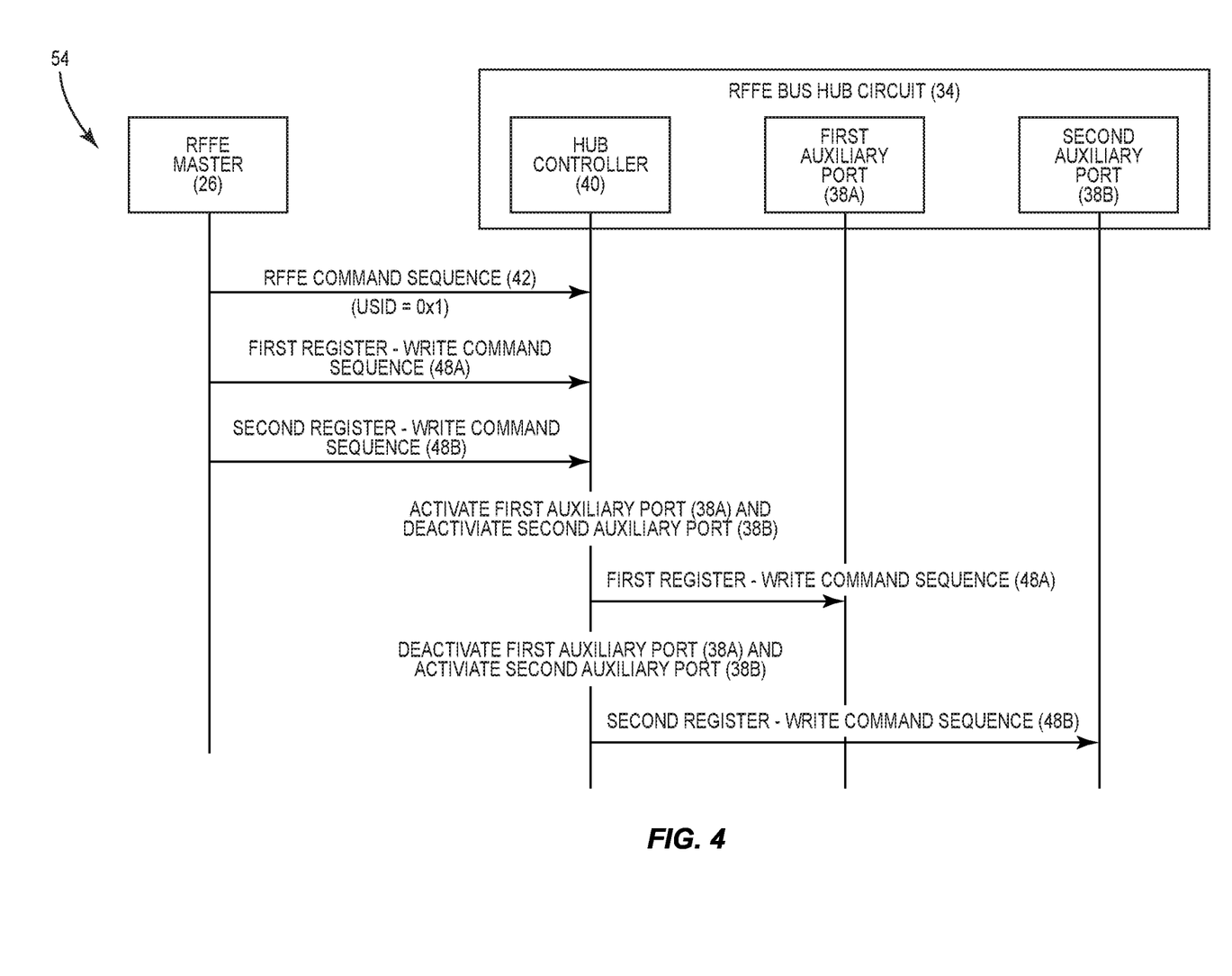
FIG. 4 is a flow diagram providing an exemplary illustration of the RFFE apparatus of FIG. 2 configured to write alternately to a pair of auxiliary RFFE buses.

Specific non-limiting working examples of the RFFE apparatus 22 of FIG. 2 are now discussed with reference to FIGS. 4-8 below. In this regard, FIG. 4 is a flow diagram 54 providing an exemplary illustration of the RFFE apparatus 22 of FIG. 2 configured to write alternately to the first auxiliary RFFE bus 28A and the second auxiliary RFFE bus 28B. Common elements between FIGS. 2 and 4 are shown therein with common element numbers and will not be re-described herein.

The hub controller 40 is configured to receive the RFFE command sequence 42 associated with the specially assigned USID (USID=1), the first RFFE command sequence(s) 48A, and the second RFFE command sequence(s) 48B from the primary port 36. In a non-limiting example, the first RFFE command sequence(s) 48A is a first register-write command sequence 48A corresponding to a selected first RFFE slave among the first RFFE slaves 30(1)-30(M). In this regard, the first RFFE command sequence(s) 48A can be associated with any USID between 0x2 and 0xF. Similarly, the second RFFE command sequence(s) 48B is a second register-write command sequence 48B corresponding to a selected second RFFE slave among the second RFFE slaves 32(1)-32(N). In this regard, the second RFFE command sequence(s) 48B can be associated with any USID between 0x2 and 0xF.

In response to receiving the RFFE command sequence 42 associated with the specially assigned USID (USID=1), the hub controller may be configured (e.g., via the REGMAP 52) to activate the first auxiliary port 38A and deactivate the second auxiliary port 38B. Accordingly, the hub controller 40 may forward the first register-write command sequence 48A to the first auxiliary port 38A for communication to the selected first RFFE slave on the first auxiliary RFFE bus 28A. Next, the hub controller 40 may be configured (e.g., via the REGMAP 52) to deactivate the first auxiliary port 38A and activate the second auxiliary port 38B. Accordingly, the hub controller 40 may forward the second register-write command sequence 48B to the second auxiliary port 38B for communication to the selected second RFFE slave on the second auxiliary RFFE bus 28B. By keeping only one of the first auxiliary port 38A and the second auxiliary port 38B activated at any given time, it is possible to uniquely identify the first RFFE slaves 30(1)-30(M) and the second RFFE slaves 32(1)-32(N) with the same set of USIDs without causing potential identification conflict.

With reference back to FIG. 2, the first RFFE slaves 30(1)-30(M) may include first shadow memories 56(1)-56(M) for storing configuration parameters related to the first RFFE slaves 30(1)-30(M), respectively. Likewise, the second RFFE slaves 32(1)-32(N) may include second shadow memories 58(1)-58(N) for storing configuration parameters related to the second RFFE slaves 32(1)-32(N), respectively. As such, it may be possible to program the first shadow memories 56(1)-56(M) and/or the second shadow memories 58(1)-58(N) via an RFFE register-write command sequence(s).

Figure 5:
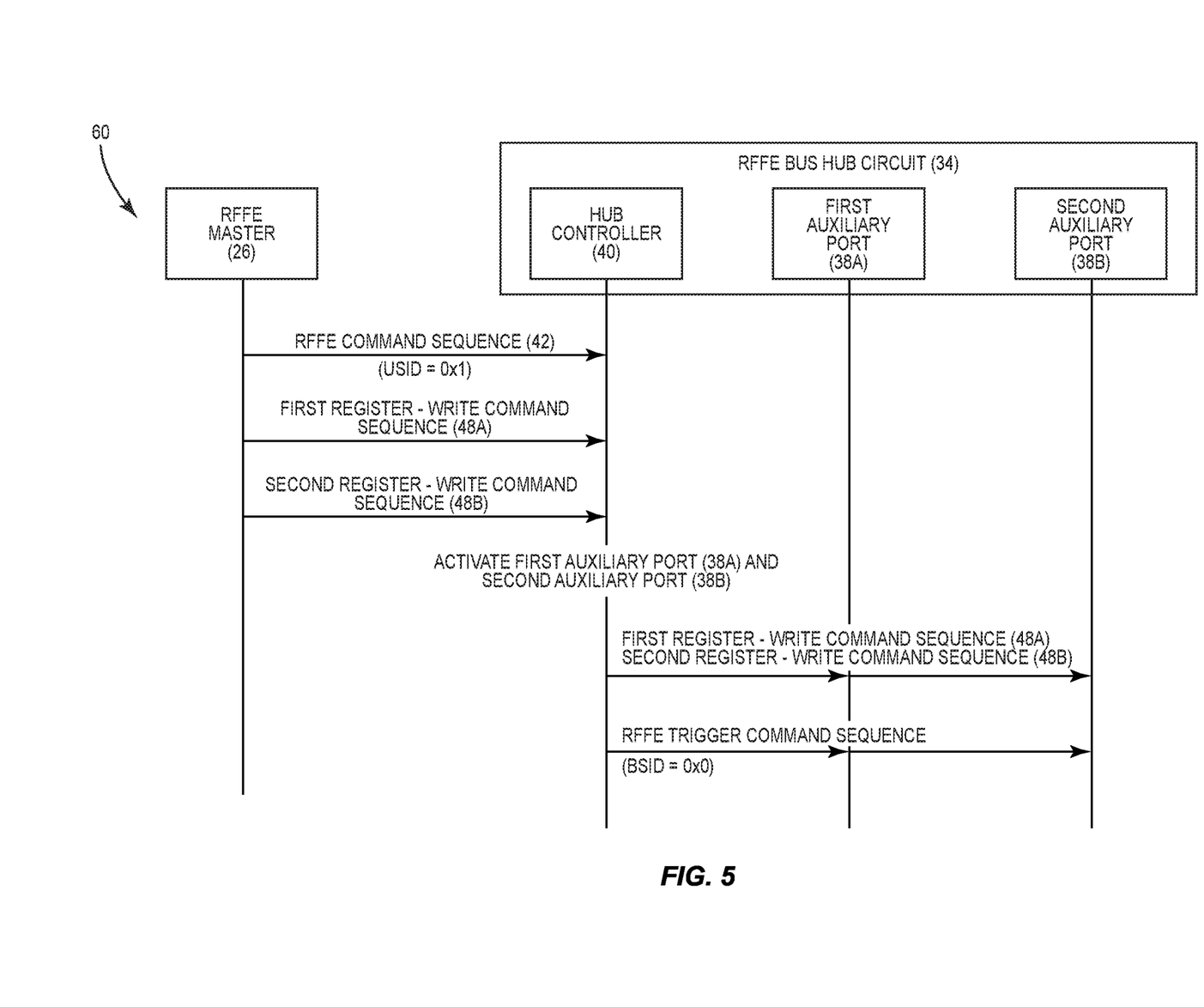
FIG. 5 is a flow diagram providing an exemplary illustration of the RFFE apparatus of FIG. 2 configured to write concurrently to a pair of auxiliary RFFE buses based on a broadcast slave identification (BSID)

In this regard, FIG. 5 is a flow diagram 60 providing an exemplary illustration of the RFFE apparatus 22 of FIG. 2 configured to write concurrently to the first auxiliary RFFE bus 28A and the second auxiliary RFFE bus 28B based on a BSID. Common elements between FIGS. 2 and 5 are shown therein with common element numbers and will not be re-described herein.

The hub controller 40 is configured to receive the RFFE command sequence 42 associated with the specially assigned USID (USID=1), the first RFFE command sequence(s) 48A, and the second RFFE command sequence(s) 48B from the primary port 36. In a non-limiting example, the first RFFE command sequence(s) 48A is a first register-write command sequence 48A corresponding to the first RFFE slaves 30(1)-30(M). Similarly, the second RFFE command sequence(s) 48B is a second register-write command sequence 48B corresponding to the second RFFE slaves 32(1)-32(N).

In response to receiving the RFFE command sequence 42 associated with the specially assigned USID (USID=1), the hub controller may be configured (e.g., via the REGMAP 52) to activate concurrently the first auxiliary port 38A and the second auxiliary port 38B. Accordingly, the hub controller 40 may store the first register-write command sequence 48A in the first shadow memories 56(1)-56(M) via the first auxiliary port 38A. Concurrently, the hub controller 40 may store the second register-write command sequence 48B in the second shadow memories 58(1)-58(M) via the second auxiliary port 38B. Subsequently, the hub controller 40 may be configured (e.g., via the REGMAP 52) to provide concurrently an RFFE trigger command sequence to the first RFFE slaves 30(1)-30(M) and the second RFFE slaves 32(1)-32(N). The RFFE trigger command sequence may be associated with a BSID (BSID=0x0), which causes the first RFFE slaves 30(1)-30(M) to be updated based on the first shadow memories 56(1)-56(M), respectively. Likewise, the BSID also causes the second RFFE slaves 32(1)-32(N) to be updated based on the second shadow memories 58(1)-58(N), respectively.

Figure 6:
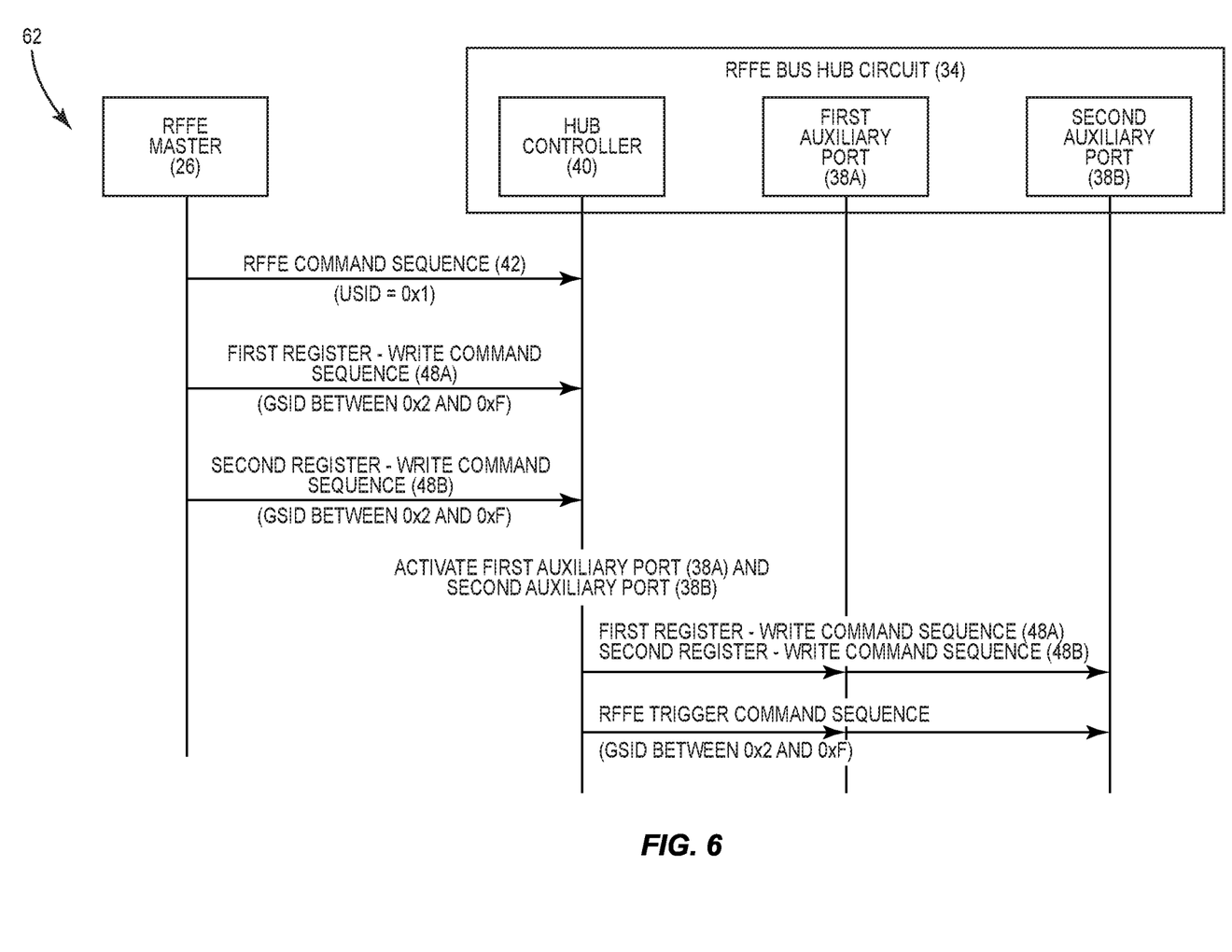
FIG. 6 is a flow diagram providing an exemplary illustration of the RFFE apparatus of FIG. 2 configured to write concurrently to a pair of auxiliary RFFE buses based on a group slave identification (GSID)

In contrast to updating all of the first RFFE slaves 30(1)-30(M) and all of the second RFFE slaves 32(1)-32(N) based on the BSID, it may also be possible to update some of the first RFFE slaves 30(1)-30(M) and/or some of the second RFFE slaves 32(1)-32(N) based on GSIDs. In this regard, FIG. 6 is a flow diagram 62 providing an exemplary illustration of the RFFE apparatus 22 of FIG. 2 configured to write concurrently to the first auxiliary RFFE bus 28A and the second auxiliary RFFE bus 28B based on a GSID. Common elements between FIGS. 2 and 6 are shown therein with common element numbers and will not be re-described herein.

The hub controller 40 is configured to receive the RFFE command sequence 42 associated with the specially assigned USID (USID=1), the first RFFE command sequence(s) 48A, and the second RFFE command sequence(s) 48B from the primary port 36. In a non-limiting example, the first RFFE command sequence(s) 48A is a first register-write command sequence 48A corresponding to one or more selected first RFFE slaves among the first RFFE slaves 30(1)-30(M) associated with a GSID between 0x2 (inclusive) and 0xF (inclusive). Similarly, the second RFFE command sequence(s) 48B is a second register-write command sequence 48B corresponding to one or more selected second RFFE slaves among the second RFFE slaves 32(1)-32(N) associated with a GSID between 0x2 (inclusive) and 0xF (inclusive).

In response to receiving the RFFE command sequence 42 associated with the specially assigned USID (USID=1), the hub controller may be configured (e.g., via the REGMAP 52) to activate concurrently the first auxiliary port 38A and the second auxiliary port 38B. Accordingly, the hub controller 40 may store the first register-write command sequence 48A in one or more of the first shadow memories 56(1)-56(M) via the first auxiliary port 38A. Concurrently, the hub controller 40 may store the second register-write command sequence 48B in one or more of the second shadow memories 58(1)-58(M) via the second auxiliary port 38B. Subsequently, the hub controller 40 may be configured (e.g., via the REGMAP 52) to provide concurrently an RFFE trigger command sequence to the first RFFE slaves 30(1)-30(M) and the second RFFE slaves 32(1)-32(N). The RFFE trigger command sequence may be associated with the GSID, which causes the one or more selected first RFFE slaves and the one or more selected second RFFE slaves being updated based on the one or more first shadow memories and the one or more selected second shadow memories, respectively.

Figure 7:
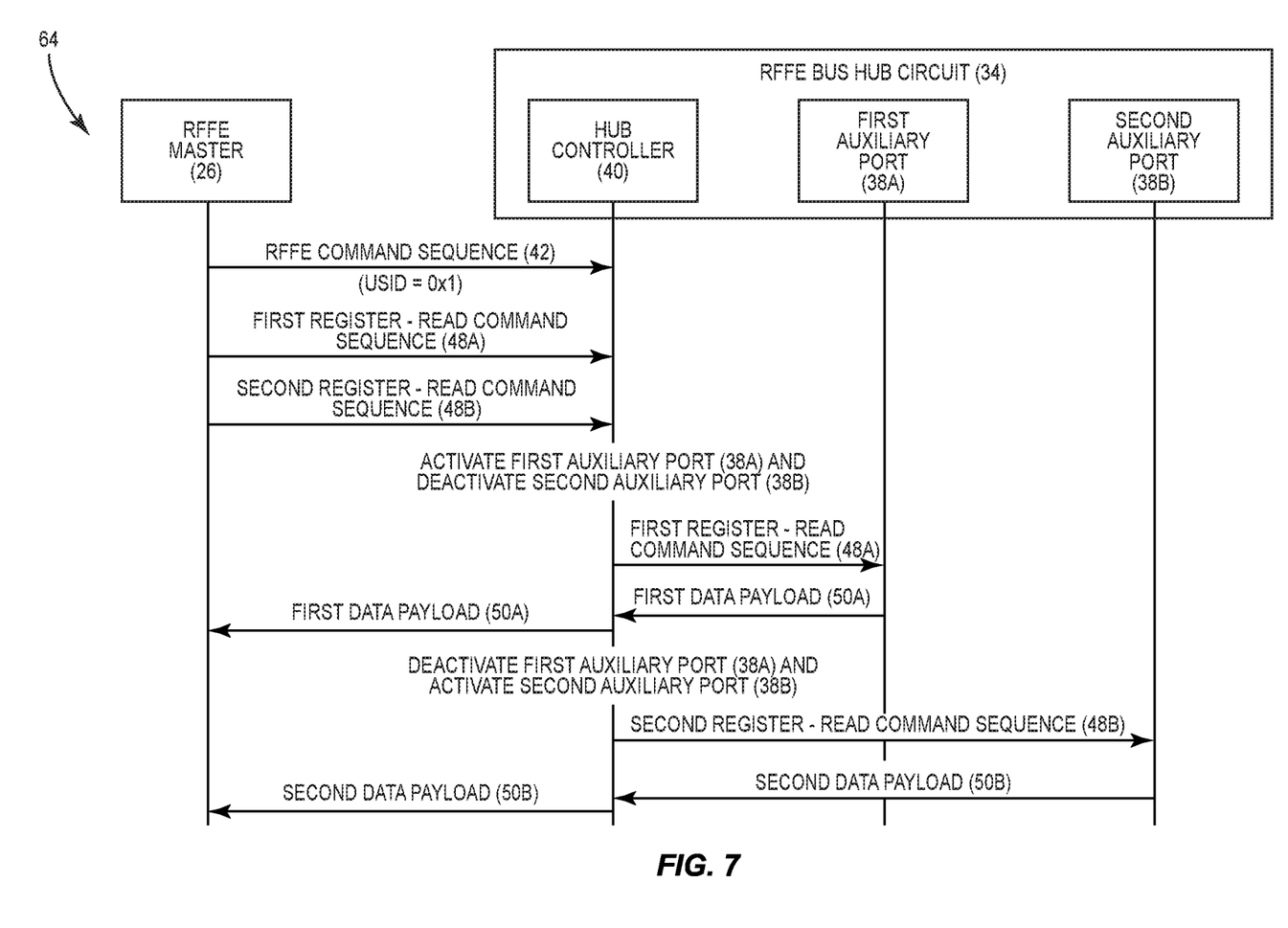
FIG. 7 is a flow diagram providing an exemplary illustration of the RFFE apparatus of FIG. 2 configured to read alternately from a pair of auxiliary RFFE buses.

FIG. 7 is a flow diagram 64 providing an exemplary illustration of the RFFE apparatus 22 of FIG. 2 configured to read alternately from the first auxiliary RFFE bus 28A and the second auxiliary RFFE bus 28B. Common elements between FIGS. 2 and 7 are shown therein with common element numbers and will not be re-described herein.

The hub controller 40 is configured to receive the RFFE command sequence 42 associated with the specially assigned USID (USID=1), the first RFFE command sequence(s) 48A, and the second RFFE command sequence(s) 48B from the primary port 36. In a non-limiting example, the first RFFE command sequence(s) 48A is a first register-read command sequence corresponding to a selected first RFFE slave among the first RFFE slaves 30(1)-30(M). Similarly, the second RFFE command sequence(s) 48B is a second register-read command sequence corresponding to a selected second RFFE slave among the second RFFE slaves 32(1)-32(N).

In response to receiving the RFFE command sequence 42 associated with the specially assigned USID (USID=1), the hub controller may be configured (e.g., via the REGMAP 52) to activate the first auxiliary port 38A and deactivate the second auxiliary port 38B. Accordingly, the hub controller 40 may forward the first register-read command sequence 48A to the first auxiliary port 38A for communication to the selected first RFFE slave on the first auxiliary RFFE bus 28A. Subsequently, the hub controller 40 receives a first data payload 50A from the selected first RFFE slave via the first auxiliary RFFE bus 28A and forwards the first data payload 50A to the RFFE master 26 via the RFFE bus 24.

Next, the hub controller 40 may be configured (e.g., via the REGMAP 52) to deactivate the first auxiliary port 38A and activate the second auxiliary RFFE bus 28B. Accordingly, the hub controller 40 may forward the second register-read command sequence 48B to the second auxiliary port 38B for communication to the selected second RFFE slave on the second auxiliary RFFE bus 28B. Subsequently, the hub controller 40 receives a second data payload 50B from the selected second RFFE slave via the second auxiliary RFFE bus 28B and forwards the second data payload 50B to the RFFE master 26 via the RFFE bus 24.

Figure 8:
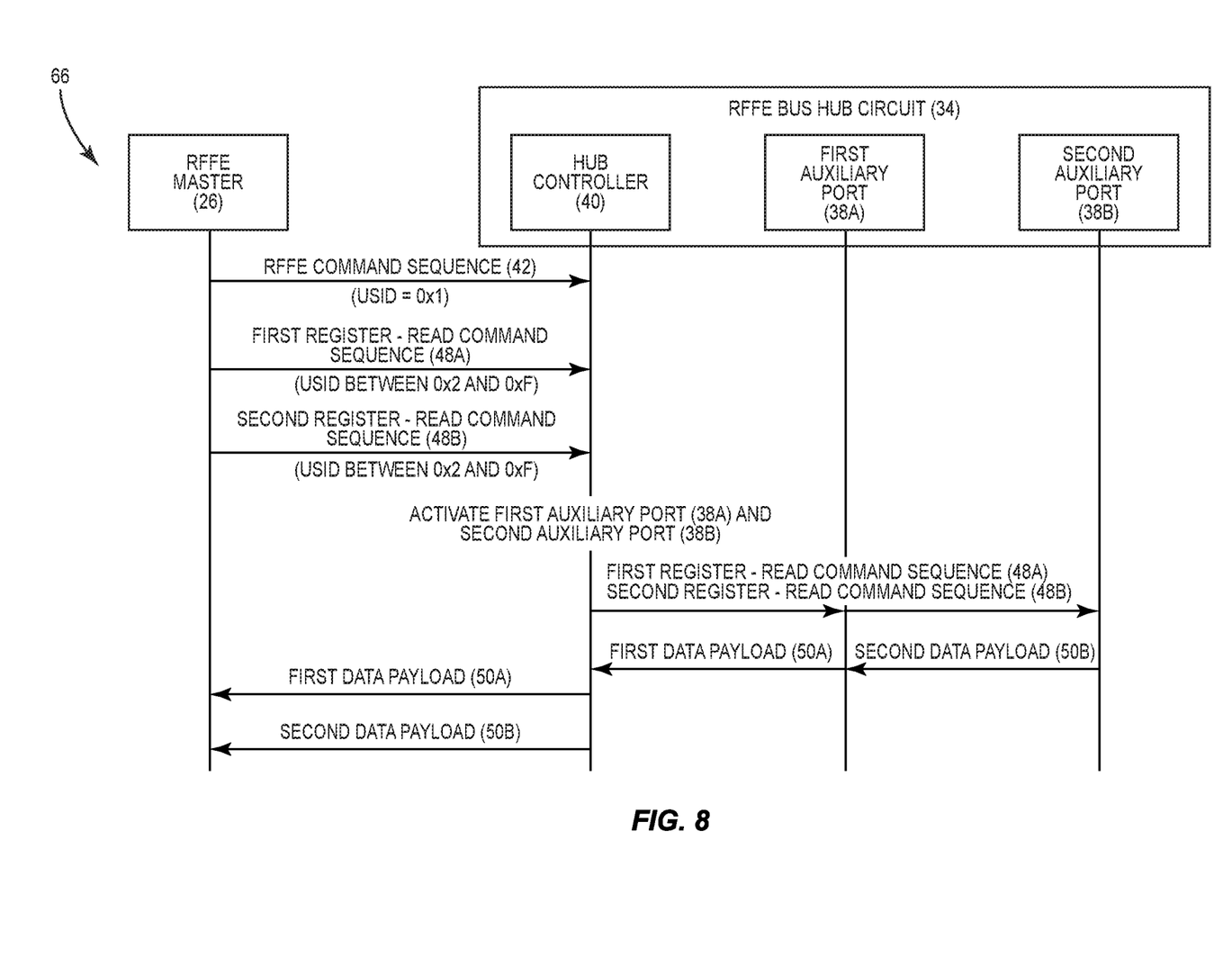
FIG. 8 is a flow diagram providing an exemplary illustration of the RFFE apparatus of FIG. 2 configured to read concurrently from a pair of auxiliary RFFE buses.

FIG. 8 is a flow diagram 66 providing an exemplary illustration of the RFFE apparatus 22 of FIG. 2 configured to read concurrently from the first auxiliary RFFE bus 28A and the second auxiliary RFFE bus 28B. Common elements between FIGS. 2 and 7 are shown therein with common element numbers and will not be re-described herein.

The hub controller 40 is configured to receive the RFFE command sequence 42 associated with the specially assigned USID (USID=1), the first RFFE command sequence(s) 48A, and the second RFFE command sequence(s) 48B from the primary port 36. In a non-limiting example, the first RFFE command sequence(s) 48A is a first register-read command sequence corresponding to a selected first RFFE slave among the first RFFE slaves 30(1)-30(M) identified by a first selected USID between 0x2 (inclusive) and 0xF (inclusive). Similarly, the second RFFE command sequence(s) 48B is a second register-read command sequence corresponding to a selected second RFFE slave among the second RFFE slaves 32(1)-32(N) identified by a second selected USID between 0x2 (inclusive) and 0xF (inclusive).

In response to receiving the RFFE command sequence 42 associated with the specially assigned USID (USID=1), the hub controller may be configured (e.g., via the REGMAP 52) to activate concurrently the first auxiliary port 38A and the second auxiliary port 38B. Accordingly, the hub controller 40 may forward the first register-read command sequence 48A to the first auxiliary port 38A for communication to the selected first RFFE slave on the first auxiliary RFFE bus 28A. Concurrently, the hub controller 40 may forward the second register-read command sequence 48B to the second auxiliary port 38B for communication to the selected second RFFE slave on the second auxiliary RFFE bus 28B.

Subsequently, the hub controller 40 may receive concurrently a first data payload 50A from the selected first RFFE slave via the first auxiliary RFFE bus 28A and a second data payload 50B from the selected second RFFE slave via the second auxiliary RFFE bus 28B. The hub controller 40 may be configured (e.g., via the REGMAP 52) to forward the first data payload 50A and the second data payload 50B based on a data forwarding order. For example, the hub controller 40 may forward the second data payload 50B after forwarding the first data payload 50A. The second data payload 50B may be buffered or discarded while the hub controller 40 is forwarding the first data payload 50A.

The hub controller 40 may be configured to determine the data forwarding order by prioritizing the first data payload 50A and the second data payload 50B. In a non-limiting example, the hub controller 40 may prioritize the first data payload 50A and the second data payload 50B based on such factors as quality-of-service (QoS) requirement, specific value of the first selected USID and/or the second selected USID, and so on. The factors used for prioritizing the first data payload 50A and the second data payload 50B may be stored in the REGMAP 52.

Those skilled in the art will recognize improvements and modifications to the embodiments of the present disclosure. All such improvements and modifications are considered within the scope of the concepts disclosed herein and the claims that follow.

What is claimed is:

1. A radio frequency front-end (RFFE) bus hub circuit comprising:
a primary port coupled to an RFFE master via an RFFE bus;
at least one first auxiliary port coupled to at least one first RFFE slave via at least one first auxiliary RFFE bus;
at least one second auxiliary port coupled to at least one second RFFE slave via at least one second auxiliary RFFE bus separated from the at least one first auxiliary RFFE bus; and
a hub controller configured to:
selectively activate at least one of the at least one first auxiliary port and the at least one second auxiliary port in response to receiving an RFFE command sequence identifying the RFFE bus hub circuit; and
bridge communication between the RFFE master and at least one of the at least one first RFFE slave and the at least one second RFFE slave.

2. The RFFE bus hub circuit of claim 1 configured to function as a special RFFE slave and identified by a specially assigned unique slave identification (USID) between hexadecimal value one (0x1) and hexadecimal value fifteen (0xF), wherein the hub controller is further configured to activate the at least one of the at least one first auxiliary port and the at least one second auxiliary port in response to receiving the RFFE command sequence associated with the specially assigned USID.

3. The RFFE bus hub circuit of claim 2 wherein each of the at least one first auxiliary RFFE bus and the at least one second auxiliary RFFE bus is configured to support a plurality of USIDs between hexadecimal value one (0x1) and hexadecimal value fifteen (0xF) excluding the specially assigned USID.

4. The RFFE bus hub circuit of claim 1 wherein the hub controller is further configured to:
receive a register-write command sequence from the primary port; and
forward the register-write command sequence to the at least one of the at least one first auxiliary port and the at least one second auxiliary port.

5. The RFFE bus hub circuit of claim 1 wherein the hub controller is further configured to:
  receive a register-read command sequence from the primary port; and
  forward the register-read command sequence to the at least one of the at least one first auxiliary port and the at least one second auxiliary port.

6. The RFFE bus hub circuit of claim 1 wherein the hub controller is further configured to:
  receive a data payload from the at least one of the at least one first auxiliary port and the at least one second auxiliary port; and
  forward the data payload to the primary port.

7. A radio frequency front-end (RFFE) apparatus comprising:
  an RFFE bus and an RFFE master coupled to the RFFE bus;
  at least one first auxiliary RFFE bus and a plurality of first RFFE slaves coupled to the at least one first auxiliary RFFE bus;
  at least one second auxiliary RFFE bus separated from the at least one first auxiliary RFFE bus and a plurality of second RFFE slaves coupled to the at least one second auxiliary RFFE bus; and
  an RFFE bus hub circuit comprising:
    a primary port coupled to the RFFE bus;
    at least one first auxiliary port coupled to the at least one first auxiliary RFFE bus;
    at least one second auxiliary port coupled to the at least one second auxiliary RFFE bus; and
    a hub controller configured to:
      selectively activate at least one of the at least one first auxiliary port and the at least one second auxiliary port in response to receiving an RFFE command sequence identifying the RFFE bus hub circuit; and
      bridge communication between the RFFE master and at least one of the plurality of first RFFE slaves and the plurality of second RFFE slaves.

8. The RFFE apparatus of claim 7 wherein:
  the RFFE bus hub circuit is configured to function as a special RFFE slave and identified by a specially assigned unique slave identification (USID) between hexadecimal value one (0x1) and hexadecimal value fifteen (0xF); and
  the hub controller is further configured to activate the at least one of the at least one first auxiliary port and the at least one second auxiliary port in response to receiving the RFFE command sequence associated with the specially assigned USID.

9. The RFFE apparatus of claim 8 wherein each of the at least one first auxiliary RFFE bus and the at least one second auxiliary RFFE bus is configured to support a plurality of USIDs between hexadecimal value one (0x1) and hexadecimal value fifteen (0xF) excluding the specially assigned USID.

10. The RFFE apparatus of claim 7 wherein the hub controller is further configured to:
  receive a register-write command sequence from the primary port; and
  forward the register-write command sequence to the at least one of the at least one first auxiliary port and the at least one second auxiliary port.

11. The RFFE apparatus of claim 7 wherein the hub controller is further configured to:
  receive a register-read command sequence from the primary port; and
  forward the register-read command sequence to the at least one of the at least one first auxiliary port and the at least one second auxiliary port.

12. The RFFE apparatus of claim 7 wherein the hub controller is further configured to:
  receive a data payload from the at least one of the at least one first auxiliary port and the at least one second auxiliary port; and
  forward the data payload to the primary port.

13. The RFFE apparatus of claim 7 wherein the hub controller is further configured to:
  receive a first register-write command sequence corresponding to a selected first RFFE slave among the plurality of first RFFE slaves, a second register-write command sequence corresponding to a selected second RFFE slave among the plurality of second RFFE slaves, and the RFFE command sequence corresponding to the RFFE bus hub circuit;
  activate the at least one first auxiliary port and deactivate the at least one second auxiliary port in response to receiving the RFFE command sequence corresponding to the RFFE bus hub circuit;
  forward the first register-write command sequence to the selected first RFFE slave via the at least one first auxiliary port;
  deactivate the at least one first auxiliary port and activate the at least one second auxiliary port after forwarding the first register-write command sequence to the selected first RFFE slave; and
  forward the second register-write command sequence to the selected second RFFE slave via the at least one second auxiliary port.

14. The RFFE apparatus of claim 7 wherein the hub controller is further configured to:
  receive a first register-write command sequence corresponding to the plurality of first RFFE slaves, a second register-write command sequence corresponding to the plurality of second RFFE slaves, and the RFFE command sequence corresponding to the RFFE bus hub circuit;
  activate concurrently the at least one first auxiliary port and the at least one second auxiliary port in response to receiving the RFFE command sequence corresponding to the RFFE bus hub circuit;
  store the first register-write command sequence in the plurality of first RFFE slaves via the at least one first auxiliary port;
  store the second register-write command sequence in the plurality of second RFFE slaves via the at least one second auxiliary port; and
  provide concurrently an RFFE trigger command sequence to the plurality of first RFFE slaves and the plurality of second RFFE slaves via the at least one first auxiliary port and the at least one second auxiliary port.

15. The RFFE apparatus of claim 14 wherein the hub controller is further configured to provide concurrently the RFFE trigger command sequence in association with a broadcast slave identification (BSID) to the plurality of first RFFE slaves and the plurality of second RFFE slaves.

16. The RFFE apparatus of claim 7 wherein the hub controller is further configured to:
  receive a first register-write command sequence corresponding to one or more selected first RFFE slaves among the plurality of first RFFE slaves, a second register-write command sequence corresponding to one or more selected second RFFE slaves among the plurality of second RFFE slaves, and the RFFE command sequence corresponding to the RFFE bus hub circuit;

activate concurrently the at least one first auxiliary port and the at least one second auxiliary port in response to receiving the RFFE command sequence corresponding to the RFFE bus hub circuit;

store the first register-write command sequence in the one or more selected first RFFE slaves via the at least one first auxiliary port;

store the second register-write command sequence in the one or more selected second RFFE slaves via the at least one second auxiliary port; and provide concurrently an RFFE trigger command sequence to the one or more selected first RFFE slaves and the one or more selected second RFFE slaves via the at least one first auxiliary port and the at least one second auxiliary port.

17. The RFFE apparatus of claim 16 wherein:

the one or more selected first RFFE slaves and the one or more selected second RFFE slaves are associated with a group slave identification (GSID); and the hub controller is further configured to provide concurrently the RFFE trigger command sequence in association with the GSID to the one or more selected first RFFE slaves and the one or more selected second RFFE slaves.

18. The RFFE apparatus of claim 7 wherein the hub controller is further configured to:

receive a first register-read command sequence corresponding to a selected first RFFE slave among the plurality of first RFFE slaves, a second register-read command sequence corresponding to a selected second RFFE slave among the plurality of second RFFE slaves, and the RFFE command sequence corresponding to the RFFE bus hub circuit;

activate the at least one first auxiliary port and deactivate the at least one second auxiliary port;

forward the first register-read command sequence to the selected first RFFE slave via the at least one first auxiliary port;

receive a first data payload from the selected first RFFE slave via the at least one first auxiliary port;

forward the first data payload to the RFFE master via the primary port;

deactivate the at least one first auxiliary port and activate the at least one second auxiliary port;

forward the second register-read command sequence to the selected second RFFE slave via the at least one second auxiliary port;

receive a second data payload from the selected second RFFE slave via the at least one second auxiliary port; and forward the second data payload to the RFFE master via the primary port.

19. The RFFE apparatus of claim 7 wherein the hub controller is further configured to:

receive a first register-read command sequence corresponding to a selected first RFFE slave among the plurality of first RFFE slaves, a second register-read command sequence corresponding to a selected second RFFE slave among the plurality of second RFFE slaves, and the RFFE command sequence corresponding to the RFFE bus hub circuit;

activate the at least one first auxiliary port and the at least one second auxiliary port concurrently;

forward the first register-read command sequence and the second register-read command sequence to the selected first RFFE slave and the selected second RFFE slave via the at least one first auxiliary port and the at least one second auxiliary port, respectively;

receive a first data payload and a second data payload concurrently from the selected first RFFE slave and the selected second RFFE slave, respectively;

determine a data forwarding order; and forward the first data payload and the second data payload to the RFFE master based on the data forwarding order.

20. The RFFE apparatus of claim 19 wherein the hub controller is further configured to determine the data forwarding order by prioritizing the first data payload and the second data payload.

* * * * *